Oct. 13, 1964 L. A. ROBINSON 3,152,784

PIPE SUPPORT

Filed March 28, 1962

INVENTOR

LLOYD A. ROBINSON

BY John N. Randolph

ATTORNEY

United States Patent Office 3,152,784

Patented Oct. 13, 1964

3,152,784

PIPE SUPPORT

Lloyd A. Robinson, R.D. 2, Springville, Pa.

Filed Mar. 28, 1962, Ser. No. 183,105

4 Claims. (Cl. 248—74)

This invention relates to a novel support primarily adapted for supporting a filler pipe on a silo and externally thereof.

More particularly, it is an object of the present invention to provide a support including a part which is secured to and projects outwardly from a silo, a second part which is secured to the filler pipe, and a third part connected to the first and second parts and adjustable with respect to one of said parts for varying the spacing between the filler pipe and silo.

Various other objects and advantages of the invention will hereinafter become more fully apparent from the following description of the drawing, illustrating a presently preferred embodiment thereof, and wherein.

Figures 1, 2, 3, 4, 5:
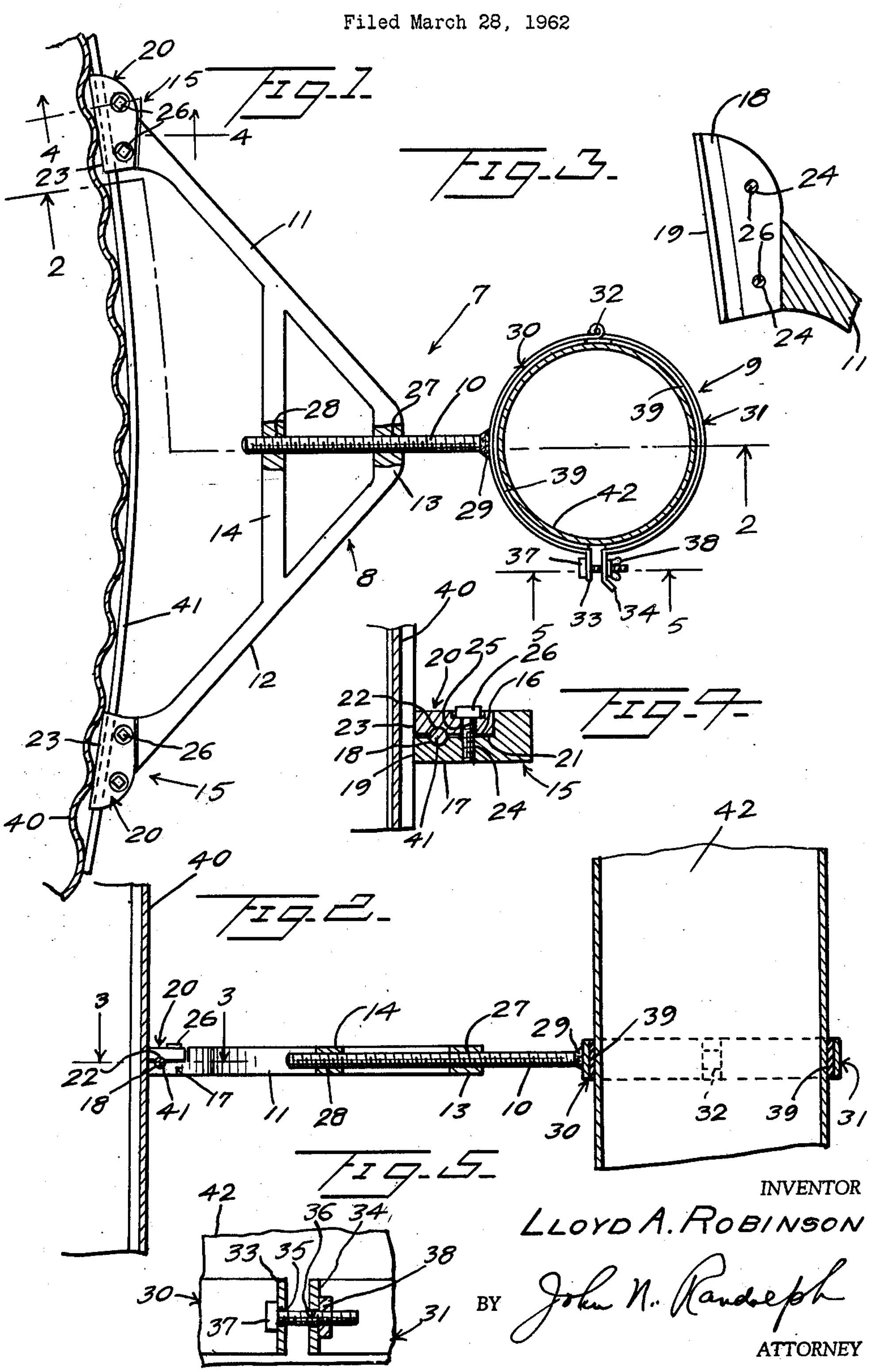
FIGURE 1 is a plan view partly in horizontal section showing the pipe support in an applied position.
FIGURE 2 is an enlarged sectional view taken substantially along the line 2—2 of FIGURE 1.
FIGURE 3 is an enlarged fragmentary sectional view of a part of the support, taken substantially along a plane as indicated by the line 3—3 of FIGURE 2.
FIGURE 4 is an enlarged transverse sectional view taken substantially along the line 4—4 of FIGURE 1.
FIGURE 5 is an enlarged fragmentary sectional view taken substantially along a plane as indicated by the line 5—5 of FIGURE 1.

Referring more specifically to the drawing, the pipe support in its entirety and comprising the invention is designated generally 7 and includes a bracket 8, a pipe clamp 9 and a threaded rod 10, which rod connects the pipe clamp and bracket.

The bracket 8 is substantially A-shaped, including two corresponding arms 11 and 12 which extend in diverging relation to one another from an intermediate apex portion 13. A cross brace 14 extends between and is connected, preferably integrally, to intermediate portions of the arms 11 and 12.

The arms 11 and 12 have corresponding distal ends, designated generally 15, each of which includes a recessed face 16 which is disposed in a plane parallel to the plane of the bracket 8 and which constitutes a surface of a terminal part 17 of one of the arms and which is an integral part of the bracket 8. Said terminal part 17 constitutes a stationary clamping jaw having a groove 18 which extends from end-to-end of the part 17 and longitudinally of the bracket 8, and which is located adjacent an outer edge 19 of the jaw 17, as best seen in FIGURE 4. Each distal end 15 includes a detachable jaw 20 which fits in the recess partially defined by the face 16, and which jaw 20 extends from end-to-end of the jaw 17 and has an inner face 21 which is disposed in opposed relation to the face 16 and which is provided with a groove 22 which extends from end-to-end of said jaw 20 and which is located adjacent an outer edge 23 of the jaw 20.

As best seen in FIGURE 3, the jaw 17 has two longitudinally spaced threaded bores 24 which extend perpendicularly therethrough and which open through the face 16 more remote from the outer edge 19 than the groove 18. The removable jaw 20 has two longitudinally spaced openings 25 which align with the bores 24 when the jaw 20 is correctly seated in the recess of the jaw 17 and with the groove 22 thereof disposed in opposed relation to the groove 18 and with the outer edge 23 disposed flush with the outer edge 19. The openings 25 are larger than the bores 24 to loosely receive portions of the shanks of headed bolts 26 which extend loosely through said openings 25 and threadedly engage the bores 24 for detachably and adjustably connecting the jaw 20 of each distal end 15 to the jaw 17 thereof.

The intermediate or apex portion 13 has a threaded bore 27 extending therethrough and the brace 14 has a corresponding threaded bore 28 which aligns with the bore 27. Portions of the rod 10 threadedly engage the bores 27 and 28 and an outer end of the rod 10 is permanently and rigidly secured as by welding, as seen at 29, to the outer side of a half section 30 of the pipe clamp 9 which also includes a section 31. The sections 30 and 31 are each substantially semicircular and complementary ends of said sections are connected by a hinge 32 for swinging movement of the section 31 relative to the section 30. The other ends of the sections 30 and 31 terminate in outturned lips 33 and 34, respectively, which are normally disposed in spaced apart relation to one another and which have openings 35 and 36, respectively, as best seen in FIGURE 5, to loosely receive the shank of a headed bolt 37. The head of the bolt 37 bears against the outer side of one of the lips, such as the lip 33, and a wingnut 38 threadedly engages the bolt shank and bears against the outer side of the other lip 34. The rod 10 is secured to the clamp section 30 approximately midway of its ends. The inner surfaces of the clamp sections 30 and 31 are preferably lined with strips of rubber 39 which extend to adjacent the ends thereof.

A portion of an annular silo wall 40 is shown in FIGURES 1 and 2 and a part of one hoop or ring 41 which is disposed around the exterior of the wall 40 is also shown in these views. The jaw edges 19 and 23 and the grooves 18 and 22 are curved longitudinally to conform to the arcs of the wall 40 and hoop 41.

When applying the support 7, the bolts 26 are loosened sufficiently so that portions of the hoop 41 can be engaged between the jaws 17 and 20 of the two distal ends or clamps 15 and positioned in the grooves 18 and 22 thereof. The depths of the grooves 18 and 22 are less than half the cross sectional dimension of the hoop 41 so that when the bolts 26 are tightened the clamps 15 will be secured rigidly to the hoop 41 with the outer edges 19, 23 of said clamps bearing against the outer side of the wall 40 for supporting the bracket 8 exteriorly of and substantially perpendicular to the wall 40, as seen in FIGURES 1 and 2. The pipe clamp 9 may be rotated with the rod 10 to extend or retract said rod relative to the bracket 8 for varying the spacing between the bracket 8 and the clamp 9, after which, with the fastening 37, 38 removed, the clamp halves 30 and 31 can be engaged around a pipe 42 and the pipe clamped between the halves 30 and 31 by reapplying the fastening 37, 38 and tightening the nut 38 thereof. The pipe 42 constitutes a filler pipe through which silage is blown upwardly and discharged into the upper part of the silo of which the wall 40 forms a part, as is conventional. The rubber strips 39 provide good frictional engagement to prevent the pipe 42 slipping relative to the clamp 9 after the clamp has been tightened. Since the spacing between the clamp 9 and bracket 8 can be varied by rotating the rod 10 in the bracket openings 27 and 28, before the clamp 9 is applied to the pipe 42, as previously described, the spacing between the pipe 42 and silo wall 40 can be varied to locate the pipe 42 in the most convenient position relative to the silo.

Various modifications and changes are contemplated and may be resorted to, without departing from the function or scope of the invention as hereinafter defined by the appended claims.

I claim as my invention:

1. A pipe support comprising a rigid substantially A- shaped bracket having corresponding arms, clamps constituting terminal portions of said arms, said clamps being angularly disposed relative to one another and adapted to engage spaced portions of a silo wall encircling hoop for supporting said bracket externally of and substantially perpendicular to a silo wall, a rod connected to and extending axially outward from said bracket, means connecting the rod to the bracket for movement of the rod only in directions axially of the bracket and a pipe clamp secured to an outer end of said rod and adapted to detachably engage a pipe for supporting the pipe externally of the silo wall.

2. A pipe support as in claim 1, each of said clamps including a fixed jaw formed integral with the arm thereof and an adjustable jaw, said jaws having jaw faces provided with opposed grooves in which a part of the hoop is adapted to be releasably clamped, said grooves having a curvature adapted to conform to the curvature of the hoop.

3. A pipe support as in claim 2, said clamps having outer surfaces disposed concentric with the grooves thereof and which are adapted to abut portions of the silo wall.

4. A pipe support comprising a rigid substantially A- shaped bracket having corresponding arms, clamps constituting terminal portions of said arms, said clamps being angularly disposed relative to one another and adapted to engage spaced portions of a silo wall encircling hoop for supporting said bracket externally of and substantially perpendicular to a silo wall, a rod connected to and extending axially outward from said bracket, a pipe clamp secured to an outer end of said rod and adapted to detachably engage a pipe for supporting the pipe externally of the silo wall, said bracket having a cross brace and an apex portion each provided with a threaded bore, said bores being disposed in alignment with one another, and said rod being threaded to threadedly engage said bores for extending and retracting the rod relative to the brackets for varying the spacing between the bracket and pipe clamp and for immovably supporting the pipe clamp relative to the bracket.

References Cited in the file of this patent

UNITED STATES PATENTS

| | | |
|---|---|---|
| 840,046 | Cutter | Jan. 1, 1907 |
| 1,798,223 | Richardson | Mar. 31, 1931 |
| 1,832,315 | McNulty | Nov. 17, 1931 |